T. G. STOUGH.
DISPENSING RECEPTACLE.
APPLICATION FILED JAN. 16, 1915. RENEWED JAN. 21, 1920.
1,332,476.
Patented Mar. 2, 1920.
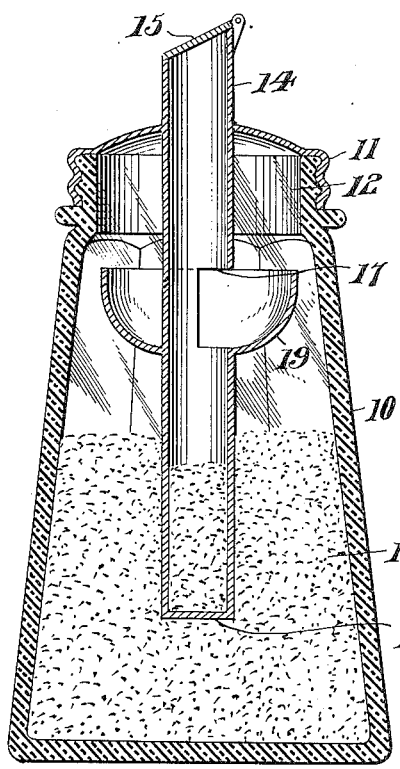
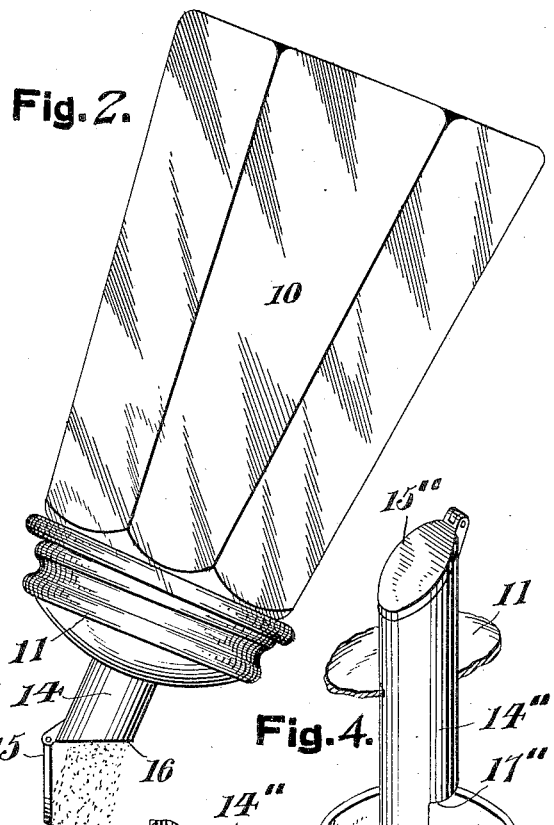
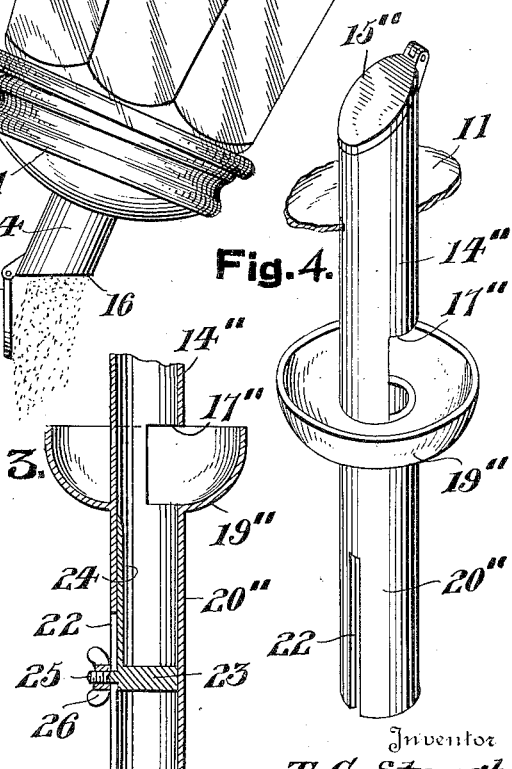
Witnesses
M. E. Lowry
D. W. Bryant
Inventor
T. G. Stough
By A. M. Wilson
Attorney

UNITED STATES PATENT OFFICE.

TURNEY G. STOUGH, OF JEANNETTE, PENNSYLVANIA.

DISPENSING-RECEPTACLE.

1,332,476.  Specification of Letters Patent.  Patented Mar. 2, 1920.

Application filed January 16, 1915, Serial No. 2,598. Renewed January 21, 1920. Serial No. 353,095.

*To all whom it may concern:*

Be it known that I, TURNEY G. STOUGH, a citizen of the United States, residing at Jeannette, in the county of Westmoreland and State of Pennsylvania, have invented certain new and useful Improvements in Dispensing-Receptacles, of which the following is a specification.

This invention relates to certain new and useful improvements in a dispensing receptacle.

The primary object of the invention is to provide a receptacle adapted for containing sugar, spices or other material in any desired form such as granulated, pulverized or liquid, and designed for dispensing the same in regulated measured quantities.

A further object is to provide a dispensing container, normally closed and capable of measuring in regulated quantities the amount of contents dispensable upon each subsequent inversion of the container.

A still further object is to provide a removable dispensing top for a container that is normally closed when the container is upright but which is capable of dispensing a regulated amount of its contents when inverted but prevents the outflow of any larger than the desired amount thereof, and thus allows the dispensing of the entire container contents in measured relatively equal portions.

With these general objects in view and others that will appear as the nature of the invention is better understood, the same consists in the novel combination and arrangement of parts to be hereinafter more fully described, illustrated in the accompanying drawings and set forth in the appended claim.

In the drawings forming a part of this application and in which like-designating characters refer to corresponding parts throughout the several views.

Figure 1 is a central vertical sectional view of a dispensing receptacle embodying my invention.

Fig. 2 is a side elevation thereof in its inverted dispensing position.

Fig. 3 is a similar view of another form of regulating device and

Fig. 4 is a perspective view of a portion of the structure illustrated in Fig. 3 but with the adjusting slide removed therefrom.

Referring more in detail to the drawings, a receptacle or container 10 is illustrated preferably formed of glass or other transparent material and having a movable screw-cap 11 upon the open end 12 thereof for allowing the receptacle to be filled with its contents 13 which may be either sugar, salt, pepper, spices or liquids if desired.

The cap 11 is provided with a centrally positioned outlet pipe or dispensing tube 14 projecting therethrough and here illustrated as placed centrally thereof upon the central longitudinal axis of the container. A hinged closure lid 15 is secured to the oblique mouth opening 16 of the tube and it will be evident that the said lid will be normally closed when the receptacle is positioned upright as illustrated in Fig. 1 while an inverting of the receptacle causes the lid to automatically open. The dispensing tube 14 which extends downwardly in the receptacle is provided with a cut-out side portion 17, and a scoop flange 19, surrounding the cut-out portion, located some distance above the lower end 18 of the tube.

In Figs. 3 and 4 the tube 14″ is disclosed having a closure lid 15″ and a scooping flange 19″ positioned adjacent an excision 17″ of the tube. The inner end 20″ of the tube is provided with a longitudinal side slot 22 while a disk 23 having a finger 24 positioned within the tube and overlying the slot 22 is longitudinally shiftable within said tube portion 20″. The disk 23 has a threaded bolt 25 extending through the slot 22 and adapted for the reception of a set nut 26 and whereby the disk may be secured at any desired point within the tube extension and within the radius of the said slot. It will thus be seen that the quantity of contents that can be held by the tube end 20″ may be regulated by adjustably positioning the said disk and whereby the quantity dispensed at each operation of the device is governed.

With this arrangement of elements, it will be seen that by inverting the device 10, the portion of the tube lying inwardly of the point of connection of the flange 19″ therewith will be filled with the containing material which is scooped up by the flange 19″ and allowed to enter the tube through the excision 17 when the device is again righted. It will also be seen that the area of the scooping flange 19″ is sufficient to fill that portion of the tube below this flange when its disk is at the extreme lower end thereof and by forcing the disk upwardly in the tube it will be seen that the quantity which passes in the tube from the rear scoop will be greatly reduced.

While the forms of the invention herein shown and described are what are believed to be the preferred embodiments thereof, minor changes may be made without departing from the spirit and scope of the invention as claimed.

What I claim as new is:—

A dispensing receptacle comprising a body having a removable cap attached thereto, a tube secured centrally of the cap and extending inwardly and upwardly beyond the same, the inner portion of the tube adjacent the cap provided in its wall with a slot, a scooping flange secured about said tube and surrounding the slot, the extreme lower end of the tube provided with a longitudinal side slot, a disk movable in the inner portion of the tube and having a screw threaded shank arranged in the slot, and means fitted upon the shank to hold the disk in adjusted positions with relation to the inner portion of the tube and a pivoted closure secured to the outer end of the tube.

In testimony whereof I affix my signature in presence of two witnesses.

TURNEY G. STOUGH.

Witnesses:
 FRANK WESLING,
 H. O. ROWAN.